United States Patent

Schwope

(10) Patent No.: US 7,076,847 B2
(45) Date of Patent: Jul. 18, 2006

(54) CLAMPING PIECE

(75) Inventor: Franz Schwope, Bergisch Gladbach (DE)

(73) Assignee: ASS Maschinenbau GmbH & Co. KG, Overath-Untereschbach (DE)

(*) Notice: Subject to any disclaimer, the term of this patent is extended or adjusted under 35 U.S.C. 154(b) by 89 days.

(21) Appl. No.: 10/877,040

(22) Filed: Jun. 25, 2004

(65) Prior Publication Data

US 2005/0039311 A1 Feb. 24, 2005

(30) Foreign Application Priority Data

Jun. 25, 2003 (DE) ............... 203 09 754 U
Sep. 16, 2003 (DE) ............... 203 14 316 U

(51) Int. Cl.
| A44B 21/00 | (2006.01) |
| H01R 4/42 | (2006.01) |
| H01R 11/26 | (2006.01) |
| F16B 2/02 | (2006.01) |

(52) U.S. Cl. .............. 24/569; 439/754; 439/764; 439/765

(58) Field of Classification Search ............. 24/19, 24/335, 265 EC, 514, 569; 439/756, 758, 439/761, 762, 764, 765
See application file for complete search history.

(56) References Cited

U.S. PATENT DOCUMENTS

| 1,672,720 | A | | 6/1928 | Horsfall |
| 1,756,445 | A | * | 4/1930 | Walde ................. 439/764 |
| 2,043,512 | A | * | 6/1936 | Hoover ................ 439/519 |
| 2,287,490 | A | * | 6/1942 | Tenney ................ 439/758 |
| 2,305,503 | A | * | 12/1942 | Tenney ................ 439/764 |
| 2,894,244 | A | * | 7/1959 | Ringhof ............... 439/761 |
| 5,496,197 | A | * | 3/1996 | Grivet ................. 439/726 |
| 6,152,437 | A | | 11/2000 | Bauer et al. .......... 269/329 |

FOREIGN PATENT DOCUMENTS

DE 2 233 077 1/1974

* cited by examiner

Primary Examiner—Robert J. Sandy
(74) Attorney, Agent, or Firm—Grossman Tucker Perreault & Pfleger, PLLC

(57) ABSTRACT

The invention concerns a clamping piece having a fixing end which can be fixed to a structural profile member or the like and a clamping end having two clamping limbs which enclose a clamping eye and which can be tightened by way of a tightening means. The object of the present invention is to further develop a clamping piece of the general kind set forth in such a way that variability is increased. That is achieved in that at least one clamping limb is inclined or angled inwardly and that the tightening means are arranged displaced inclinedly with respect to the longitudinal axis of the clamping piece.

5 Claims, 2 Drawing Sheets

CLAMPING PIECE

Figure 1:
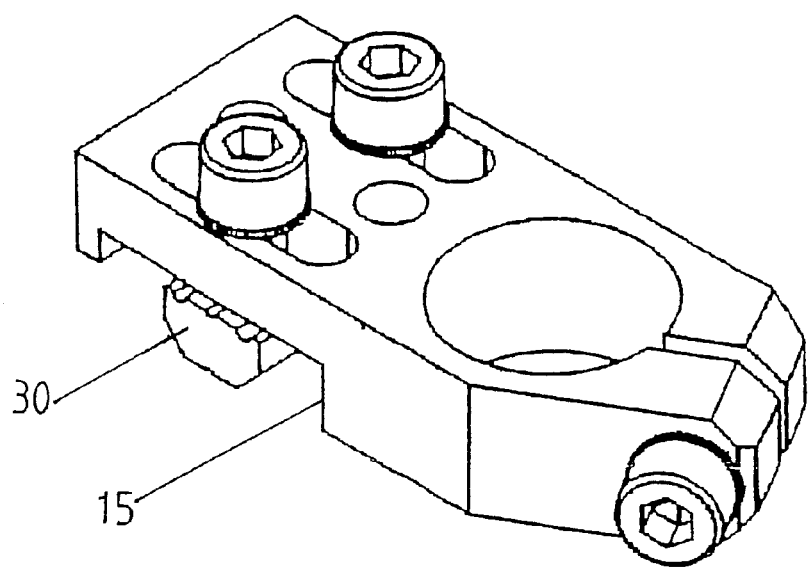

The invention concerns a clamping piece having a fixing end which can be fixed to a structural profile member or the like and a clamping end having two clamping limbs which enclose a clamping eye and which can be tightened by way of a tightening means.

The clamping piece which is preferably made from steel or high-strength aluminum and which is between about 1 cm and 1.5 cm thick is fixed with screws with the fixing end to a body, for example a structural profile member, a mounting plate or the like. The clamping eye serves for releasably fixing objects which are preferably pin-shaped or cylindrical, thus for example tubes, sleeves, gripper elements or the like. The clamping eye is in the form of a circular-cylindrical bore with a slot at one side so that this forms two clamping limbs which can be tightened towards each other by the tightening means. For tightening the clamping limbs towards each other the clamping piece preferably uses a screwthreaded screw which is screwed into a corresponding screwthread on the limbs and which is fixed laterally to the clamping piece so that the direction in which the screw longitudinally extends is at a right angle to the longitudinal axis of the clamping piece.

Clamping pieces of that kind are already in use in many different situations and make it possible for example for robot gripper elements to be mounted in customer-specific fashion according to the respective requirements involved. In part access to the screws at the fixing end or at the clamping end is however restricted by the structural space involved.

Therefore the object of the present invention is to develop a clamping piece of the general kind set forth, in such a way as to afford enhanced variability.

In a first structure it is proposed in accordance with the invention that at least one clamping limb is bevelled or angled inwardly and the tightening means is arranged displaced inclinedly with respect to the longitudinal axis of the clamping piece.

By virtue of the arrangement of the tightening means according to the invention it is now possible for two or more clamping pieces to be arranged in flush directly mutually adjacent relationship and for the tightening means nonetheless to be actuable at any time with the appropriate tools. The inclined displacement of the tightening means in relation to the clamping piece ensures that the tightening means are laterally accessible even if two or more clamping pieces are arranged in mutually juxtaposed relationship. Accordingly the inclination of the tightening means in relation to the clamping piece must be such that the tightening means is accessible laterally from the front with the corresponding tools.

Preferably therefore the tightening means is to be arranged displaced through about 30 degrees.

It is further advantageous if the fixing means at the fixing end and the tightening means are actuable with the same tool, for example with a hexagon socket screw key.

The clamping pieces known from the state of the art usually have at the fixing end two slots which extend in parallel relationship and which extend in the longitudinal direction on the clamping piece. For fixing the clamping piece to an object, for example a structural profile member, screws are inserted into the slots and screwed to a captive nut which is fitted for example into the groove in a structural profile member. The slots make it possible for the clamping piece to be arranged relatively displaceably in relation to the structural profile member. In that situation however the clamping piece is always arranged with its longitudinal axis in transverse relationship with the longitudinal axis of the structural profile member. Under certain circumstances it is desirable for the clamping piece to be arranged in alignment with the structural profile member, that is to say for the longitudinal axis of the clamping piece to be arranged to extend in colinear relationship with the longitudinal axis of the structural profile member.

For that purpose, in accordance with the invention, further fixing holes are provided at the fixing end. Fixing screws can now also be inserted into those fixing holes, for example for fixing to a captive nut. The captive nut can thus be arranged displaced through 90 degrees with respect to the position which it assumes upon assembly by means of the slots. Accordingly the clamping piece can be arranged in the desired manner in aligned relationship on the subjacent object, for example a structural profile member.

Preferably the additional fixing holes are arranged between the slots.

Instead of the fixing holes the fixing end of the clamping piece can have a cylindrical opening into which can be inserted a fixing element with which the clamping piece can be releasably arrested in a target or reference position in relation to the structural profile member to which it is mounted.

Preferably the fixing element has a circular-cylindrical, outer peripheral surface which can be inserted into the opening in the clamping piece in such a way that the clamping piece is rotatable about the fixing element in the non-fitted position. In addition provided on the fixing element are clamping means, by the actuation of which the clamping piece can be arrested in a desired target or reference position, in relation to the fixing element. The configuration according to the invention provides that the clamping piece can be mounted and fixed in any position.

In a particularly simple configuration the clamping means are in the form of a peripherally extending flange which is formed on the upward end of the clamping piece. In the installation position that flange rests on the upper edge of the opening of the clamping piece and the clamping piece can be fixed by tightening the fixing screws which are provided on the clamping piece.

In an alternative configuration the fixing element has at least one jaw which can be inserted into the opening of the clamping piece and which can be pressed in the manner of a drum brake by way of an actuating element against the inside surface of the opening on the clamping piece in order to releasably fix the clamping piece in relation to the fixing element.

It will be appreciated that the inclined arrangement of the tightening means on the clamping piece, in accordance with the invention, is not restricted to such clamping pieces with slots at the fixing end, but can be used for any fixing mode, for example including that with exclusively fixing holes at the fixing end.

Figure 2:
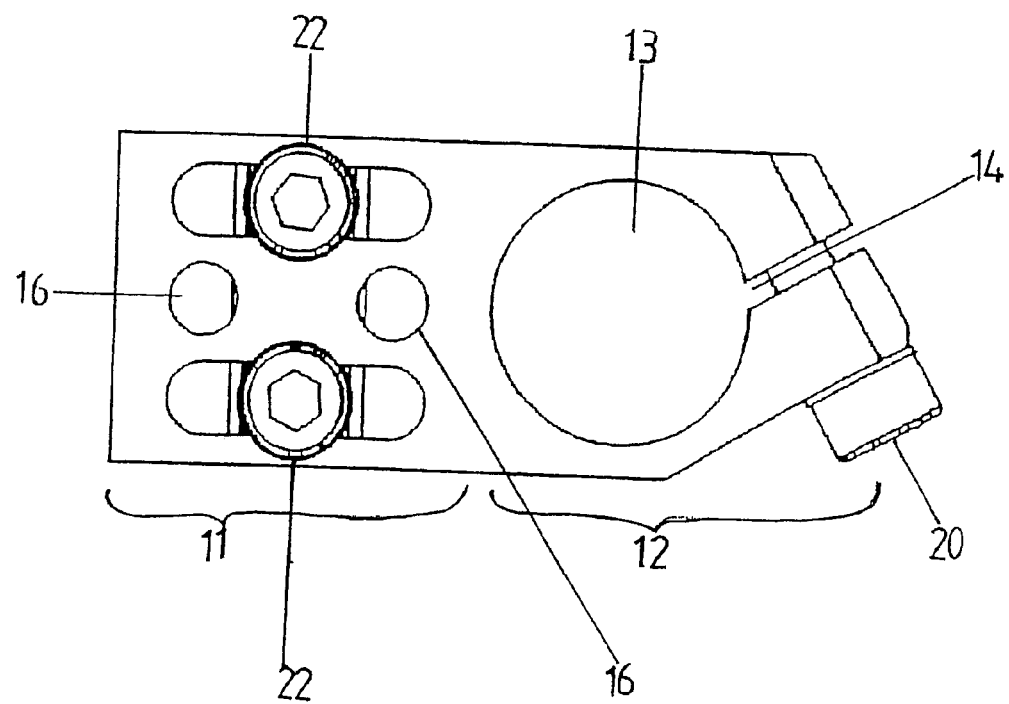
Figure 3:
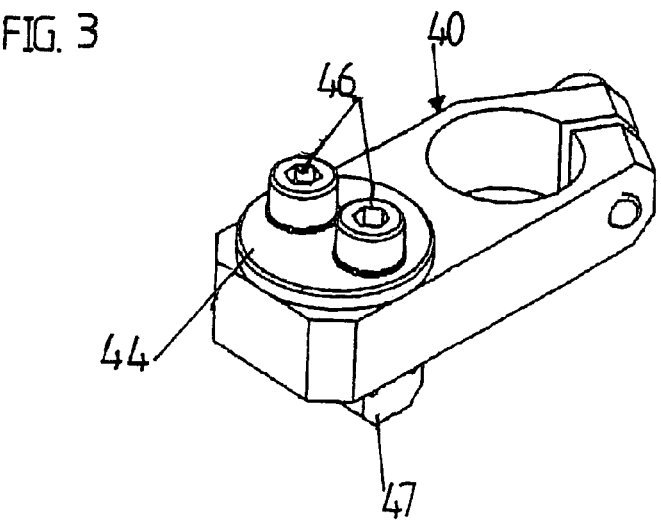
Figure 4:
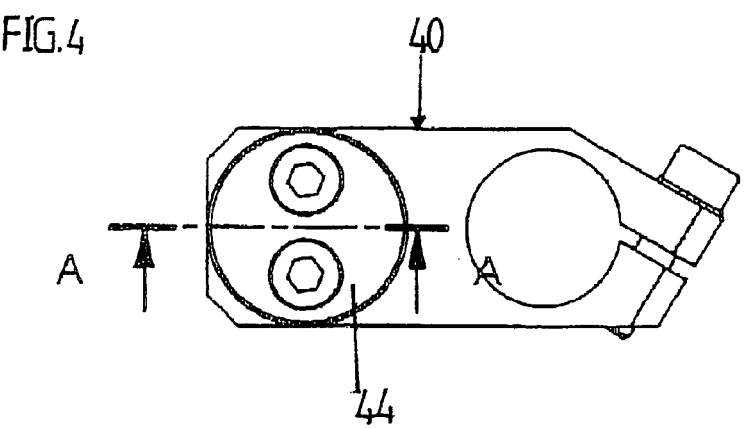
Figure 5:
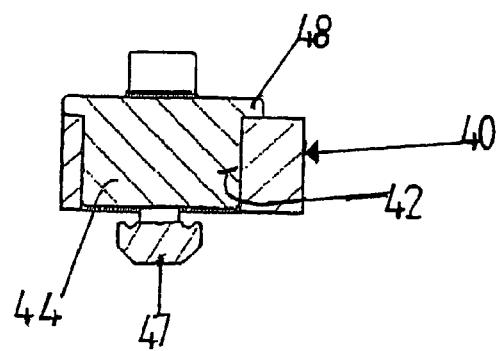

The invention is described in greater detail hereinafter and illustrated by means of a preferred embodiment in the drawings in which:

FIG. 1 shows a perspective view of the clamping piece according to the invention, FIG. 2 shows a plan view of the clamping piece of FIG. 1, FIG. 3 shows a perspective view of an alternative embodiment of the clamping piece according to the invention, FIG. 4 shows a plan view of the clamping piece of FIG. 3, and FIG. 5 shows a view in section taken along line A—A in FIG. 4.

The clamping piece which is made from high-strength aluminum is of a length of approximately 10 cm and comprises a fixing end 11 and a clamping end 12. The height of the clamping piece 10 is approximately 12 mm.

The clamping end 12 is provided with a clamping eye 13 comprising a circular-cylindrical bore in the clamping end 12, the bore having a gap 14 at one side. The gap provides the two clamping limbs of the clamping eye 13, which can be resiliently tightened towards each other by means of a hexagonal socket screw 20 in order to releasably fix objects in the clamping eye 13. The inside diameter of the present clamping eye 13 is 10 mm but alternatively it can be 14 mm, 20 mm, 30 mm or of other suitable dimensions.

It can be clearly seen that the longitudinal axis of the tightening hexagonal socket screw extends displaced through 30 degrees with respect to the longitudinal axis of the clamping piece 10. For that purpose the clamping piece 10 is angled or bevelled, for example by milling, at the longitudinal side which is the lower side in the Figure, from approximately the center of the clamping eye 13 to the end of a clamping limb. That configuration provides that the hexagonal socket screw 20 is accessible even if a clamping piece of the same design configuration is arranged beside the clamping piece 10 directly beneath it with reference to FIG. 2. The 'bevelled' configuration of the hexagonal socket screw 20 in accordance with the invention thus makes it possible for a plurality of clamping pieces to be arranged in directly mutually juxtaposed relationship without a limitation in terms of accessibility to the fixing means, in this case the hexagonal socket screw 20.

It will be appreciated that the fixing means does not have to be a hexagonal socket screw. That however is advantageous as the fixing means used for fixing the captive nut in the fixing end 11 are also hexagonal socket screws 22. Those hexagonal socket screws are screwed in known manner into a captive nut 30.

At the underside the clamping piece 10 at the fixing end 11 has a recess 15 which is adapted to the corresponding structural profile member. By means of that recess 15 the clamping piece 10 can be fitted in positively locking relationship on to the structural profile member in order to avoid transverse displacement upon loadings being applied to the structural profile member of the clamping piece 10.

If it is necessary for the clamping piece to be arranged in aligned relationship on the structural profile member the hexagonal socket screws 22 can be released and unscrewed from the captive nut 30. After the hexagonal socket screws 22 have been inserted into the fixing holes 16 it is possible to use the same captive nut in order for the clamping piece to be arranged extending in colinear relationship with the longitudinal axis of a structural profile member, for example at the ends thereof. In that case therefore the captive nut 30 is turned through 90 degrees in relation to the orientation shown in the Figures.

The alternative embodiment of the clamping piece according to the invention, which is shown in FIGS. 3 through 5, also provides that the longitudinal axis of the tightening hexagonal socket screw 30 is displaced through 30 degrees with respect to the longitudinal axis of the clamping piece 40. In this respect attention is directed to the description relation to the embodiment shown in FIGS. 1 and 2. Unlike that embodiment the fixing end of the clamping piece 40 has a circular-cylindrical opening 42 into which a fixing element 44 is inserted. The fixing element 44 comprises a circular-cylindrical body having an outer peripheral surface whose outside diameter is slightly smaller than the inside diameter of the opening 42 in the clamping piece 40. In that way the clamping piece is easily rotatable about the fixing element 44 so that it can be positioned in any desired fashion in relation to the stationary fixing element 44. For the purposes of fixing the clamping piece the two hexagonal socket screws 46 which pass through the fixing element 44 and which are screwed with their lower screwthread into a captive nut 47 in known manner are tightened. The captive nut 47 in turn can be inserted into a longitudinal groove of a known mounting profile member. It will be appreciated that the required clamping action is also achieved with a hexagonal socket screw.

The configuration according to the invention permits simple adjustment of the clamping piece without dismantling. The required clamping action is achieved by the flange 48 which extends radially outwardly in peripheral relationship at the upper end of the fixing element 44 and which, after tightening of the hexagonal socket screws 46, presses at the top side against the edge of the clamping piece 40. As can be seen in particular from FIG. 5 the height of the circular-cylindrical fixing element 44 is slightly less than the height of the clamping piece 40. That ensures that at any event the required pressing pressure for clamping the clamping piece can be implemented and the fixing element 44 does not rest on the subjacent structural profile member in the event of differing tolerances.

The clamping pieces and other components are made in the present case from high-strength aluminum, but they can comprise other suitable materials such as for example steel or fiber-reinforced plastic material for reducing weight.

It is also apparent to the man skilled in the art that mounting the clamping piece, in accordance with the invention, to a structural profile member by means of a fixing element which is fitted in an opening on the clamping piece and which can be clamped to the clamping piece is not limited to clamping pieces in which at least one clamping limb is inclined or angled inwardly and the tightening means are arranged displaced inclinedly with respect to the longitudinal axis of the clamping piece. Rather this assembly procedure according to the invention can be used for all clamping pieces, even known clamping pieces.

LIST OF REFERENCES 10 clamping piece
11 fixing end
12 clamping end
13 clamping eye
14 gap
15 recess
16 fixing hole
20 hexagonal socket screw
22 hexagonal socket screw
30 captive nut
40 clamping piece
42 opening
44 fixing element
46 hexagonal socket screw
47 captive nut
48 flange

The invention claimed is:
1. A clamping piece having a fixing end which can be fixed to a structural profile member and a clamping end having two clamping limbs which enclose a clamping eye and which can be tightened by a tightening means, wherein at least one clamping limb is inclined or angled inwardly and wherein the tightening means are arranged displaced inclinedly with respect to the longitudinal axis of the clamping piece, wherein the fixing end has at least one slot extending in the longitudinal direction and further fixing holes are provided beside the at least one slot.

2. A clamping piece as set forth in claim 1 characterized in that the tightening means is displaced by about 30 degrees.

3. A clamping piece as set forth in claim 1, further comprising at least two slots, and characterized in that two fixing holes are arranged between the at least two slots.

4. A clamping piece having a fixing end which can be fixed to a structural profile member and a clamping end having two clamping limbs which enclose a clamping eye and which can be tightened by a tightening means, at least one clamping limb is inclined or angled inwardly and wherein the tightening means are arranged displaced inclinedly with respect to the longitudinal axis of the clamping piece, and wherein the fixing end has an opening for receiving a fixing element which is provided with clamping means for clamping to the clamping piece for releasably fixing the clamping piece relative to the structural profile member.

5. A clamping piece as set forth in claim 4 characterized in that the fixing element is in the form of a circular-cylindrical body and the clamping means have a flange which is formed on the fixing element.

* * * * *